United States Patent
Reluzco et al.

(10) Patent No.: US 6,168,162 B1
(45) Date of Patent: Jan. 2, 2001

(54) SELF-CENTERING BRUSH SEAL

(75) Inventors: George Ernest Reluzco; Donald Ernest Woodmansee, both of Schenectady; Osman Saim Dinc, Troy; Norman Arnold Turnquist, Cobleskill; Christopher Edward Wolfe, Niskayuna, all of NY (US)

(73) Assignee: General Electric Co., Schenectady, NY (US)

( * ) Notice: Under 35 U.S.C. 154(b), the term of this patent shall be extended for 0 days.

(21) Appl. No.: 09/129,335

(22) Filed: Aug. 5, 1998

(51) Int. Cl.[7] .................................................. F16J 11/02
(52) U.S. Cl. ........................................... 277/355; 277/926
(58) Field of Search ................................... 277/355, 926, 277/928

(56) References Cited

U.S. PATENT DOCUMENTS

| | | |
|---|---|---|
| 768,593 | 8/1904 | Emmet et al. . |
| 779,785 | 1/1905 | Junggren . |
| 910,472 | 1/1909 | Junggren . |
| 957,887 | 5/1910 | Junggren . |
| 980,282 | 1/1911 | Junggren . |
| 1,352,277 | 9/1920 | Junggren . |
| 1,352,278 | 9/1920 | Junggren . |
| 1,505,647 | 8/1924 | Junggren . |
| 1,505,924 | 8/1924 | Warren . |
| 1,536,014 | 4/1925 | Junggren . |
| 1,594,838 | 8/1926 | Kégresse . |
| 1,651,855 | 12/1927 | Warren . |
| 1,670,071 | 5/1928 | Junggren . |
| 1,895,930 | 1/1933 | Junggren . |
| 2,336,323 | 12/1943 | Warren . |
| 2,600,991 | 6/1952 | Hargrove . |
| 2,709,338 | 5/1955 | Morley et al. . |
| 3,186,168 | 6/1965 | Ormerod et al. . |
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |
| 4,358,120 | 11/1982 | Moore . |
| 4,415,309 | 11/1983 | Atterbury . |

(List continued on next page.)

FOREIGN PATENT DOCUMENTS

| | | |
|---|---|---|
| 2938-484 | 3/1981 | (DE) . |
| 0453315 A1 | 10/1991 | (EP) . |
| 2 191 825 | 12/1987 | (GB) . |
| 2 301 635 | 12/1996 | (GB) . |
| 3-209068 | 9/1991 | (JP) . |
| WO92/05378 | 4/1992 | (WO) . |

OTHER PUBLICATIONS

"Positive Pressure Variable Clearance Packing," Morrison et al.,; GE Turbine Reference Library, May 1990.

* cited by examiner

Primary Examiner—Anthony Knight
Assistant Examiner—Vishal Patel
(74) Attorney, Agent, or Firm—Nixon & Vanderhye (57) ABSTRACT

A self-centering brush seal is disposed in an annular groove formed in a stationary component about a rotatable component, the stationary and rotatable components having a common axis. The brush seal includes a plurality of bristles projecting into sealing engagement with the rotating component. The brush seal has a radial clearance in the groove enabling the brush seal for free-floating radial excursions within the groove to maintain concentricity with the rotary component notwithstanding deviation of the axis of rotation of the rotating component relative to the axis of the fixed component. In another form, the brush seal comprises a plurality of arcuate segments having a helical coil spring biasing the segments for radial movement enabling the tips of the bristles to seal against the rotatable component. In a further embodiment, leaf springs bias each segment to maintain its bristles in engagement with the rotatable component. In a still further embodiment, the seal segments are pressure balanced in a radial direction with an O-ring seal sealing high and low pressure regions on opposite sides of the segments.

3 Claims, 7 Drawing Sheets

U.S. PATENT DOCUMENTS

| | | |
|---|---|---|
| 4,422,288 | 12/1983 | Steber . |
| 4,541,741 | 9/1985 | Woodbridge . |
| 4,567,730 | 2/1986 | Scott . |
| 4,580,346 | 4/1986 | Reichl . |
| 4,730,876 | 3/1988 | Werner et al. . |
| 4,756,536 | 7/1988 | Belcher . |
| 4,781,388 | 11/1988 | Wörhl . |
| 4,785,623 | 11/1988 | Reynolds . |
| 4,809,990 | 3/1989 | Merz . |
| 4,901,522 | 2/1990 | Commaret et al. . |
| 4,971,336 | 11/1990 | Ferguson . |
| 4,989,886 | 2/1991 | Rulis . |
| 5,002,288 | 3/1991 | Morrison et al. . |
| 5,026,252 | 6/1991 | Hoffelner . |
| 5,029,875 | 7/1991 | Spain et al. . |
| 5,029,876 | 7/1991 | Orlando et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 | 1/1993 | Stec . |
| 5,181,827 | 1/1993 | Pellow et al. . |
| 5,192,084 | 3/1993 | Norbury . |
| 5,201,530 | 4/1993 | Kelch et al. . |
| 5,316,318 | 5/1994 | Veau . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,503,405 | 4/1996 | Jewett et al. . |
| 5,509,780 | 4/1996 | Synfelt . |
| 5,524,340 | 6/1996 | Galbraith et al. . |
| 5,597,167 | 1/1997 | Snyder . |
| 5,599,026 | 2/1997 | Sanders et al. . |
| 5,630,590 | 5/1997 | Bouchard et al. . |
| 5,749,584 | 5/1998 | Skinner et al. . |
| 5,799,952 | * 9/1998 | Morrison et al. ................ 277/926 X |
| 5,997,004 | * 12/1999 | Braun et al. .................... 277/355 X |

SELF-CENTERING BRUSH SEAL

TECHNICAL FIELD

The present invention relates to brush seals for rotary machines such as steam and gas turbines, and particularly relates to self-centering brush seals for sealing between rotary and stationary components.

BACKGROUND OF THE INVENTION

Rotary machines such as steam and gas turbines, used for power generation and mechanical drive applications, are generally large machines consisting of multiple turbine stages. In the turbines, hot high pressure fluid flowing through the turbine stages must pass through a series of stationary and rotating components and seals between the stationary and rotating components are used to control leakage. Seals are also employed in other areas of the turbine than in the hot gas path; e.g., in end packings between the rotating shaft and the stationary components. Turbine efficiency is directly dependent upon the ability of the seals to prevent leakage.

Various types of seals have been employed between rotary and stationary components in turbomachinery, as well as in other machinery. Such seals have included labyrinth-type seals, brush seals, combination labyrinth/brush seals and the like. Brush seals have many advantages and benefits as compared with other types of seals. Brush seals typically are affixed in the stationary component, for example, in a fixed radial position about the rotating component. While such fixed brush seals afford very satisfactory seals for systems that are always concentric, they do not accommodate large relative off-axis motion between the rotary and fixed components, for example, during thermal transients and steady-state running conditions of the turbine. That is, brush seals accommodate only very small radial excursions of a shaft relative to a housing about the shaft. Predicting transient movement precisely by analysis is a very difficult task. Measurement of relative motion between stationary and fixed components can be costly and time-consuming. If the rotary and stationary component centerlines are not concentric during assembly or operation, the seal cannot itself maintain concentricity about the rotary component. The consequences of an incorrectly located fixed brush seal can be severe. For example, the shaft and brush seal backing plate can rub and rotor vibrations can be a consequence of heat generated during the rub. In general, brush seal performance degrades. While the brush seal fence height, i.e., the radial distance between the rotary shaft and the edge of the backing plate, can be increased to reduce the likelihood of a rub, this decreases the pressure capability of the seal.

BRIEF SUMMARY OF THE INVENTION

In accordance with the present invention, there is provided a self-centering brush seal assembly which enables the brush seal to maintain concentricity with the axis of the rotary component during radial excursions of the rotary component. The present brush seal may be provided in a number of different configurations. In its basic form, the brush seal hereof may comprise an annular backing plate with brush seal bristles extending radially from the backing plate or canted in the direction of rotation for engagement with the rotary component. The brush seal is disposed in a groove in the stationary component which affords a radial clearance between the base of the groove and radial outermost portions of the brush seal. By removing the radial constraints on the brush seal, the seal is allowed to "float" in a radial direction and follow the radial excursions of the rotating shaft without large asymmetric bristle deformations. In this manner, the seal can remain concentric with the axis of rotation of the rotary component.

In another form of the present invention, the self-centering brush seal hereof is provided in a segmented configuration. That is, a plurality of arcuate segments which may comprise the backing plate or upstream and downstream backing plates for the bristles of the brush seal are provided in short segments, for example, segments extending 60° or 90° which, together, make up a substantially closed annular ring about the rotary component. The segments and annular ring formed thereby are disposed in a groove in the stationary component with the required radial clearance, as well as with a spring which biases the segments radially inwardly to maintain engagement of the brush seal bristles with the rotary component. The spring in a preferred form may be a garter spring extending about the periphery of the segments for the full 360°. Alternatively, the radial inward bias may be provided by a plurality of leaf springs, one leaf spring for each segment, bearing between the base of the radial groove and an outer surface of the segment. In a still further form of the present invention, a combined garter/O-ring seal may be provided for disposition in a secondary groove within the groove of the stationary component.

By combining the garter spring and O-ring seal, a pressure balanced segmented brush seal may be provided. This embodiment balances the pressure on the inside and outside diameters of the brush seal by admitting low pressure fluid into the groove downstream of the O-ring seal. It will be appreciated that the bias afforded by the springs in all embodiments hereof must be such that the stiffness of the springs is low in comparison to the stiffness of the bristle pack. The springs not only maintain the seal segments in contact with the shaft but also allow the seal to maintain the designed fence height during relative off-axis motion between the rotary and stationary components.

In a preferred form of the present invention, there is provided a rotary machine comprising a component rotatable about an axis and a component fixed against rotation about the axis, the fixed component having a circumferentially extending groove opening toward the rotatable component, a brush seal disposed in the groove and including a plurality of bristles and a support for the bristles, the bristles being secured to the support and projecting therefrom beyond the support into sealing engagement with the rotatable component and the brush seal and the groove having a radial clearance therebetween enabling the brush seal for radial movement to maintain substantial concentricity and sealing engagement with the rotatable component, notwithstanding deviation of the axis of rotation of the rotatable component relative to the axis of the fixed component.

Accordingly, it is a primary object of the present invention to provide a novel and improved self-centering brush seal assembly for sealing between rotary and stationary components in turbomachinery.

DETAILED DESCRIPTION OF THE INVENTION

Figure 1:
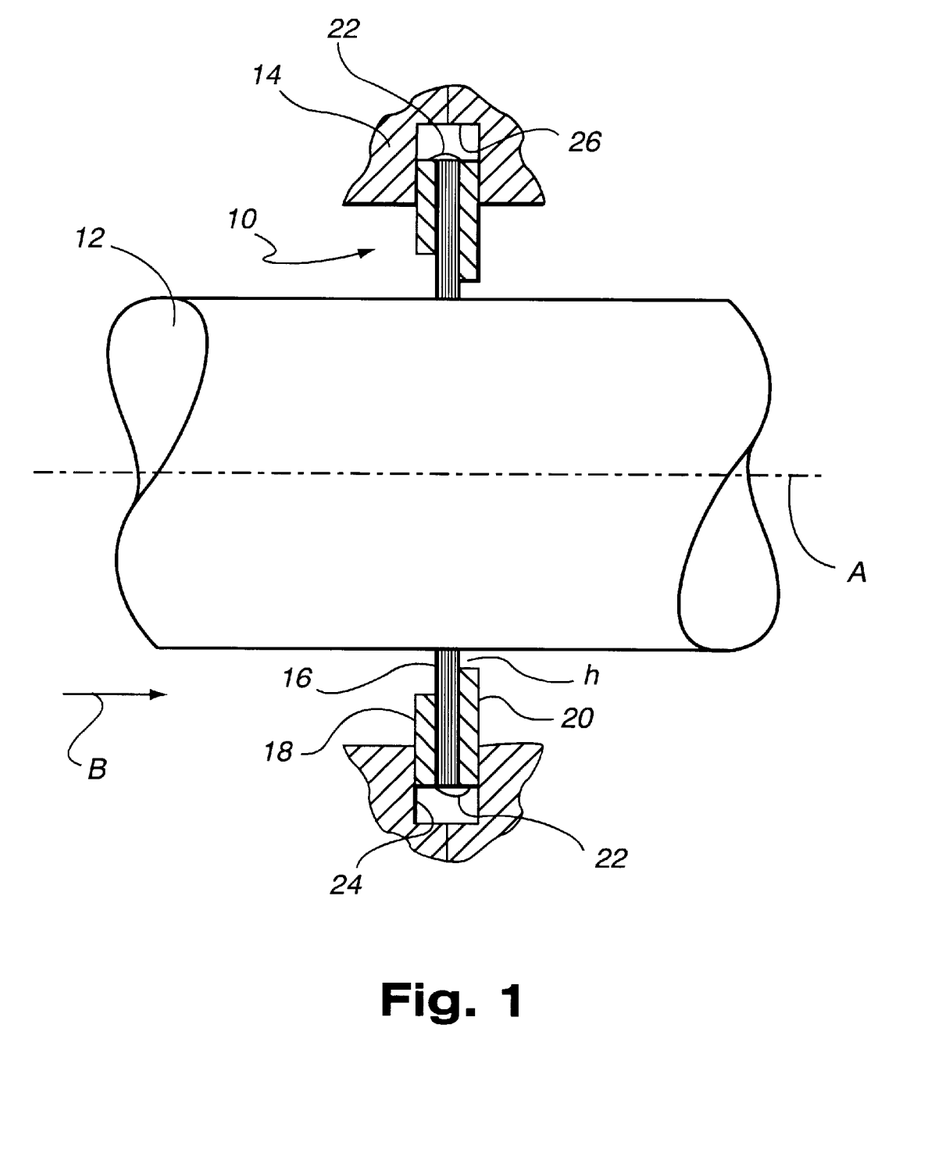
FIG. 1 is a fragmentary cross-sectional view illustrating a self-centering brush seal between rotary and stationary components according to the present invention.

Referring now to the drawings, particularly to FIG. 1, there is illustrated a self-centering brush seal between rotary and stationary components according to the present invention. Particularly, the brush seal, generally designated 10, is disposed between a rotary component, for example, a shaft 12, and a stationary component, for example, a housing 14 surrounding the shaft 12, the axis of rotation of the shaft 12 being designated A. It will be appreciated that the opening through the housing 14 is circular and lies on a common axis with axis A.

Figure 3:
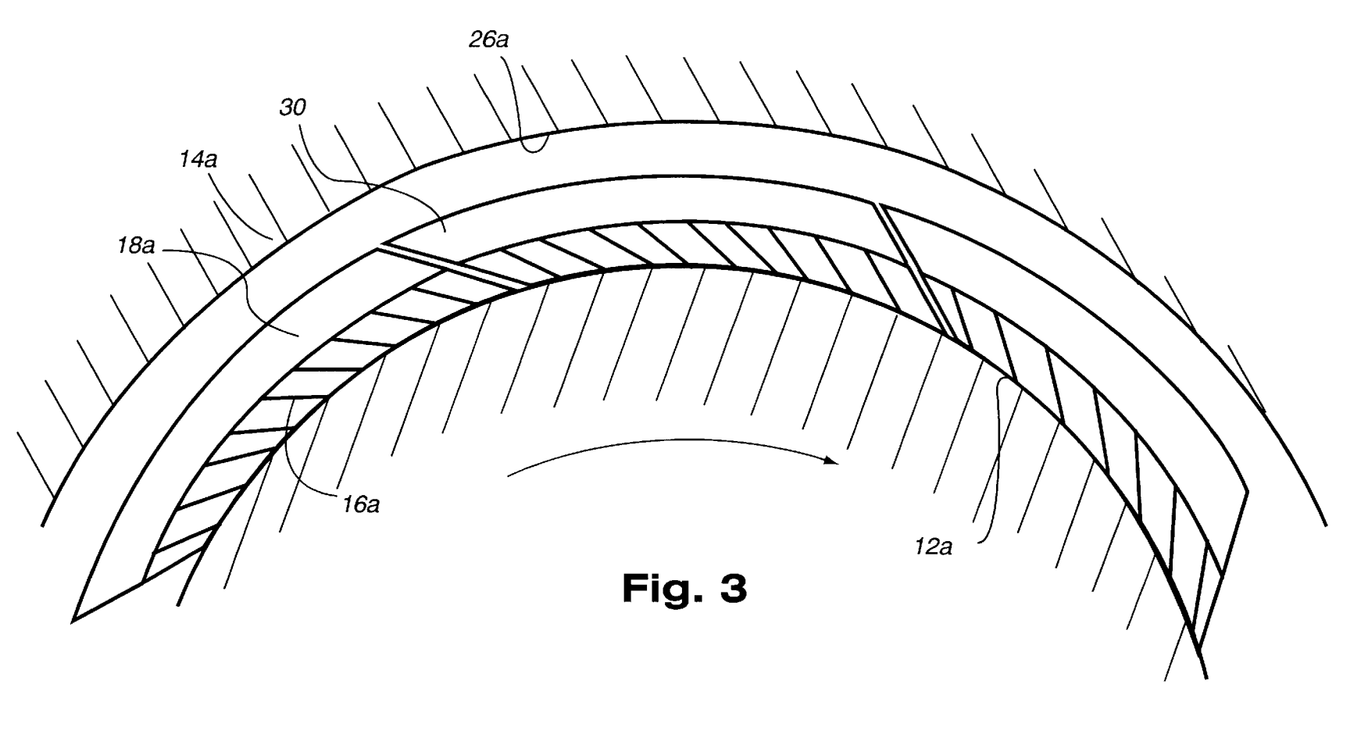
FIG. 3 is a fragmentary cross-sectional view thereof taken generally about on line 3—3 in FIG. 2.
Figure 5:
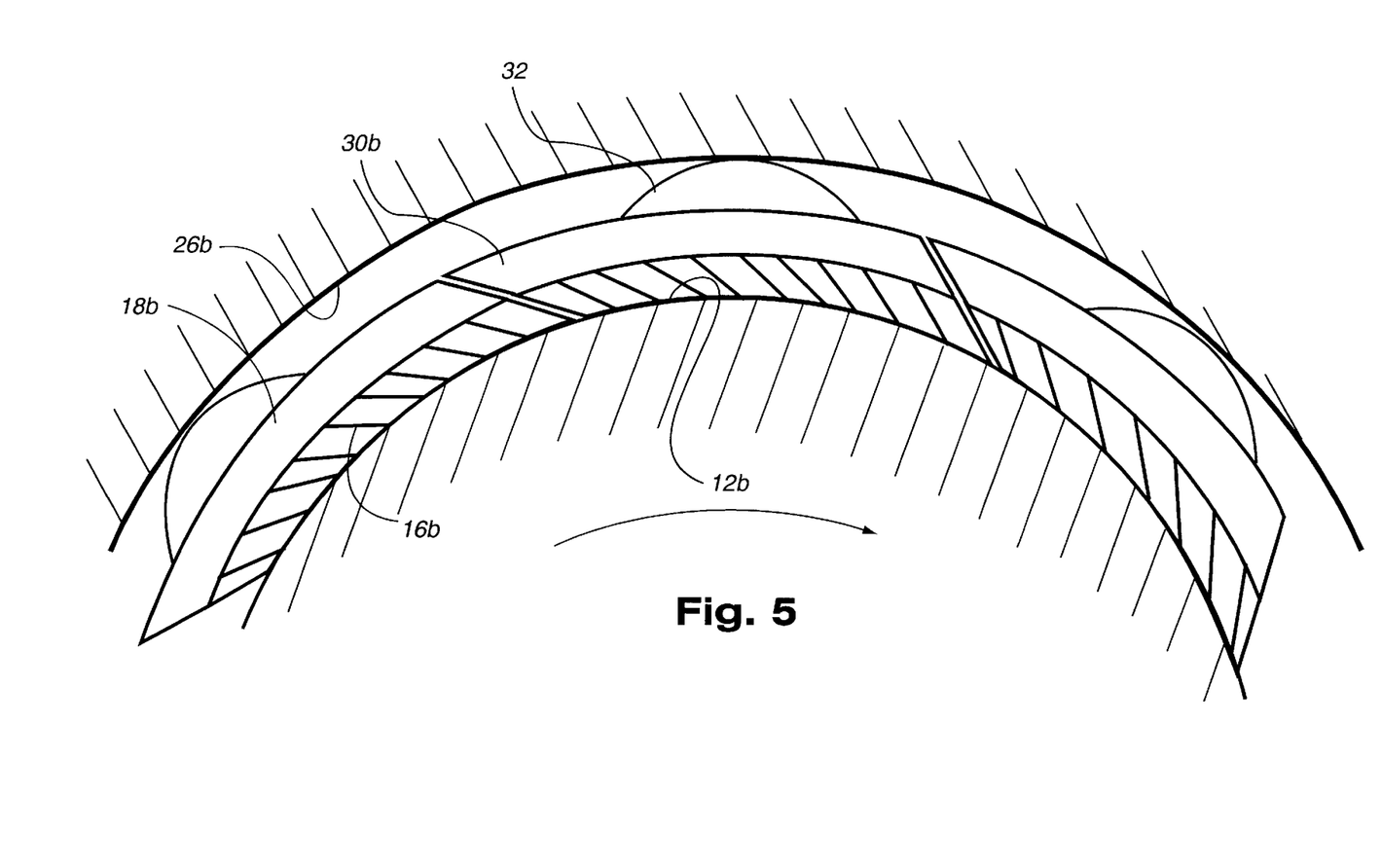
FIG. 5 is a fragmentary cross-sectional view through the rotary and stationary components illustrating the brush seal segments and leaf springs for biasing the segments of the embodiment of FIG. 4.

The brush seal 10 includes a plurality of bristles 16 which may extend in a generally radial direction but preferably lie at an angle offset from the radius in the direction of rotation of the shaft 12, for example, as illustrated in the embodiment of FIGS. 3 and 5. The bristles are sandwiched or disposed between a pair of plates 18 and 20, respectively. The bristles 16, as well as the plates 18 and 20, form a complete 360° annulus about the rotary shaft 12. The bristles 16 are generally formed of an alloy metal wire drawn to a diameter of 0.002–0.006 inches, although larger diameter wires may be used in high pressure environments. It will be appreciated, however, that the bristles may be formed of polymer or ceramic materials, although metal bristles are preferred, for example, formed of Inconel X750 or Haynes-25. From a review of FIG. 1, it will be seen that the backing plate prevents deflection of the bristles 16 under the loading from the high pressure side, the direction of seal leakage, if any, being indicated by the arrow B and being from left to right in the drawing figure. Thus, the distal ends of the bristles 16 project beyond the inner diameter edge of the downstream annular backing plate 20 to engage and form a seal with the surface of the rotary component 12, e.g., the rotating shaft. The bristles 16 are preferably welded between the plates 18 and 20, for example, by providing a weld bead 22 along the radial outermost diameter of the brush seal. The bristles project from the radial inner end of the backing plate 20 a radial distance $\underline{h}$ which corresponds to the maximum deflection of the rotary component in a radial direction. Consequently, the distance $\underline{h}$ must be a minimum corresponding to that maximum deflection and is dependent upon the expected relative radial deflection or deviation of the rotary component relative to its axis A for the specific machine and seal location. Thus, the distance $\underline{h}$ is the minimum fence height for the backing plate 20 and its inner diameter edge should exceed the distance $\underline{h}$ to the shaft.

As illustrated in FIG. 1, the brush seal 10 is disposed in a groove 24 formed through the inner surface of the housing 14. The base 26 of the groove 24 has a diameter in excess of the outer diameter of the brush seal forming a radial clearance between the brush seal and the base of the groove. As a consequence of this configuration, it will be appreciated that all constraints on radial movement of the brush seal are removed and that the brush seal 10 "floats" within the groove 24. Consequently, the brush seal 10 is maintained concentric with the axis of rotation A of the rotary component 12, notwithstanding radial excursions of the axis A during thermal transients and steady-state running conditions. That is, the actual rotation of the shaft 12 may deviate in a radial direction from its designed axis of rotation, in which event the brush seal 10 self-aligns or self-centers by radial movement within the groove 24 with the axis A of the shaft 12. Consequently, the axis of the brush seal and the shaft have common axes, notwithstanding radial excursions of the axis of the shaft 12 during assembly or operation.

Figure 2:
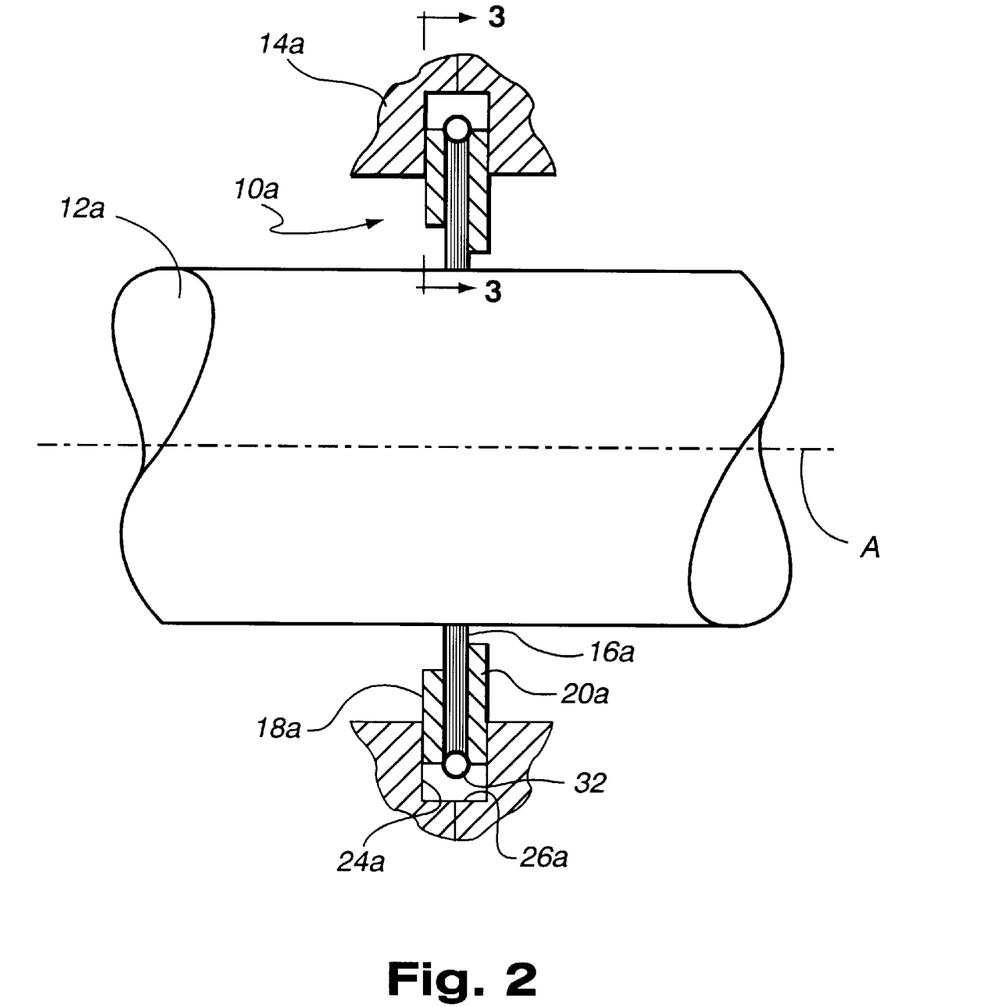
FIG. 2 is a view similar to FIG. 1 illustrating another embodiment thereof.

Referring now to FIGS. 2–3, wherein like reference numerals apply to like parts followed by the suffix "a", the brush seal 10a is provided in the form of a plurality of arcuate segments, for example, the segments 30. The segments 30 may be comprised of any number of segments, for example, from 4 to 8 or 10 segments, preferably equal to one another in arcuate length. The segments 30 may also have radially extending end faces or, as illustrated, end faces angled from the radii of the axis A in the same direction as the angled bristles. With appropriate spacing between the end faces, it will be appreciated that the segments 30 can move radially inwardly and outwardly independently of one another.

To maintain the distal ends of the bristles of the segments in constant sealing contact with the surface of the rotary shaft 12a, the segments are biased in a radial inward direction. To provide the radial inward bias, a circumferentially extending garter spring 32 is provided about the outer diameter of the brush seal 10a. The garter spring 32 biases the segments radially inwardly and has a low biasing force compared with the bristle pack thickness to permit the brush seal segments to be displaced radially outwardly upon radial excursions of the rotor 12a. The segmented brush seal 10a is otherwise freely floating within the groove 24a of the stationary component 14a.

Figure 4:
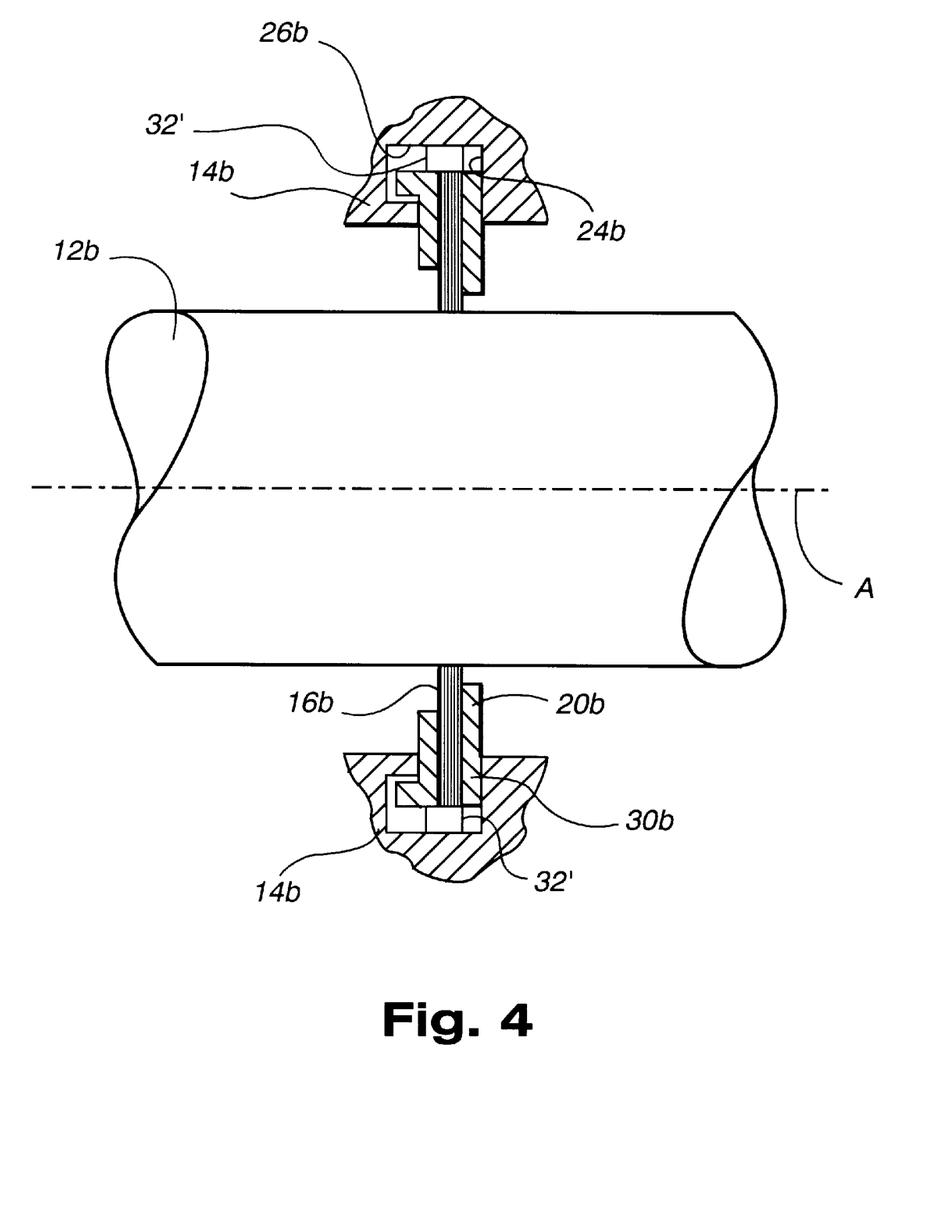
FIG. 4 is a view similar to FIG. 1 illustrating brush seal segments in a third embodiment of the present invention.

Referring now to FIGS. 4 and 5, wherein like reference numerals are applied to like parts as in the prior embodiments, followed by the suffix "b", there is illustrated brush seal segments 30b similar to those of the prior embodiment. However, in this form, the radial inward bias is provided each segment by a leaf spring 32'. The leaf spring acts between the base 26b of the groove 24b, one leaf spring 32' being preferred for each segment 30b although additional leaf springs could be provided. Preferably, one end of leaf spring 32' is in-turned into a slot in the outer diameter of the brush seal to secure the spring to the segments for ease of assembly, while the opposite end may remain free. As a consequence, each segment 30b is biased radially inwardly independently of the inward bias of other segments. In this manner, the distal ends of the bristles 16b maintain sealing contact with the outer surface of the shaft 12b, notwithstanding radial excursions of the shaft off its designed axis A.

Figure 6:
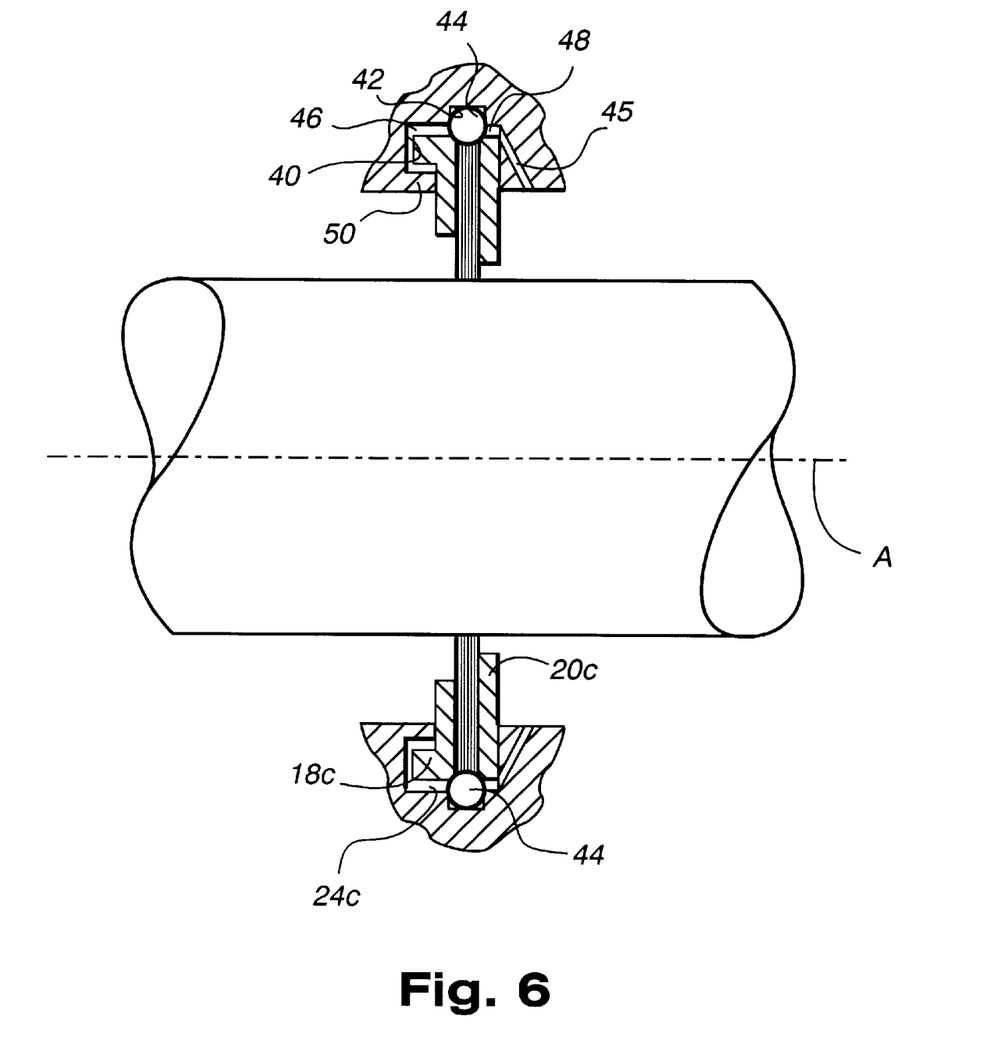
FIG. 6 is a view similar to FIG. 1 illustrating a further embodiment of the present invention.
Figure 7:
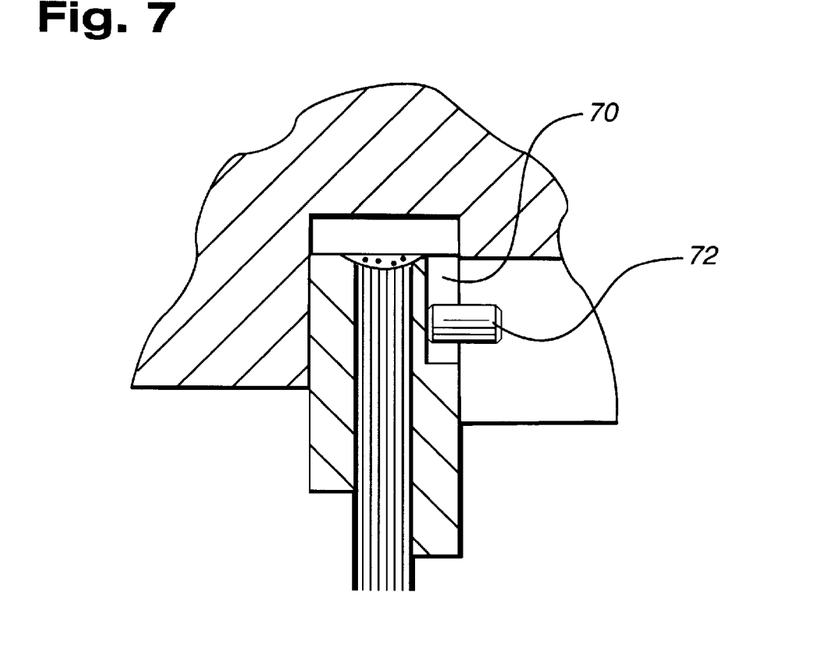
FIG. 7 is a view similar to FIG. 1 illustrating an axial pin engaging a backing plate of the brush seal.

Referring now to FIG. 6, there is illustrated a form of the present invention for use in high pressure applications. A garter spring is combined with an O-ring seal and seals within the groove to provide high and low pressure regions on opposite sides of the brush seal to balance the pressure on the inside and outside diameters of the brush seal. The groove 24c includes a dovetail 40 on the high pressure or upstream side of the seal as well as a further groove 42 formed radially outwardly for receiving the combined garter spring/O-ring seal. The groove 42 and the brush seal segments and particularly the bristles lie in a common diametrical plane. The combined garter spring and O-ring 44 seals in the groove 42 and seals between opposite sides of groove 42 defining a pair of chambers 46 and 48. A space between the plate 18c and the stationary hook 50 admits high pressure fluid into chamber 46 thereby balancing the pressure between the I.D. and O.D. on the upstream side of the brush seal. A passage 45 communicates between the low pressure region on the downstream side of the brush seal and the chamber 48 of groove 24c on the downstream side of the seal.

As a consequence of this construction, the high pressure applied against the diameter of the upstream plate 18c is balanced by the high pressure in groove 42, i.e., in chamber 46 on the outer diameter of the backing plate 18c. The low pressure applied against the inner and outer diameters of the downstream plate 20c also balance one another. Thus, a net radial inward bias is applied to the segments only by the garter spring similarly as in the embodiment of FIG. 2.

In all of the embodiments of the present invention, including the full 360° brush seal illustrated in FIG. 1 or the segmented brush seal illustrated in FIGS. 2–6, the brush seal is provided with an anti-rotation feature. For example, as illustrated in FIG. 1, a radial extending slot 70 is formed along an axial face of one of the backing plates for the brush seal. An axially extending pin 72 projects from the stationary component into the radial slot 70, preventing circumferential motion of the brush seal but enabling radial motion such that the seal can follow the excursions of the rotating component. For the 360° seal, only one pin is required, while for the segmented seal, one pin per segment is required.

Figure 8:
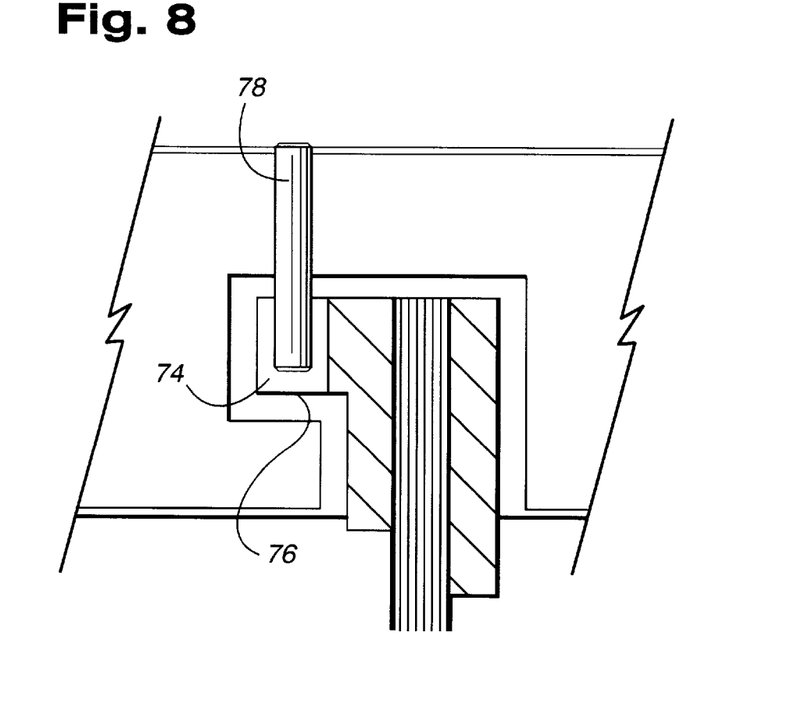
FIG. 8 is a view similar to FIG. 4 illustrating a radial pin in the flange of a backing plate.

FIG. 8 illustrates a further anti-rotation feature. In this embodiment, a radially opening slot 74 is formed in the flange 76 of one of the backing plates of the brush seal. A radially extending pin 78 affixed to the stationary component extends into slot 74, preventing circumferential movement of the brush seal relative to the stationary component, while enabling radial motion of the brush seal segment. Thus, in both forms of the anti-rotation feature, the pin forms a stop, preventing substantial circumferential movement of the brush seal relative to the stationary component.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotary machine comprising:

a component rotatable about an axis and a component fixed against rotation about said axis, said fixed component having a circumferentially extending groove opening toward said rotatable component;

a brush seal disposed in said groove and including a plurality of bristles and a support for said bristles, said bristles being secured to said support and projecting therefrom beyond said support into sealing engagement with said rotatable component;

said brush seal and said groove having a radial clearance therebetween enabling the brush seal for radial movement to maintain substantial concentricity and sealing engagement with the rotatable component, notwithstanding deviation of the axis of rotation of said rotatable component relative to the axis of said fixed component;

said rotatable component lying radially inwardly of said fixed component, said brush seal including a plurality of arcuate, circumferentially extending segments disposed in part in said groove and a spring biasing each segment for movement in a radial inward direction to maintain the bristles carried by said segments in contact with said rotatable component, said brush seal forming a seal between high and low pressure regions on respective upstream and downstream sides of said brush seal, a seal between said brush seal and said groove dividing the groove into two chambers, a passage in said stationary component in communication with the downstream low pressure side of said brush seal for communicating low pressure fluid from said downstream side to one of said chambers to balance the pressures along the inside and outside diameters of said brush seal.

2. A machine according to claim 1 wherein said spring includes a circumferentially extending helical coil spring extending in said groove in contact with each segment to bias the segment radially inwardly.

3. A machine according to claim 1 including an anti-rotation stop by said fixed component and engaging said brush seal to prevent circumferential movement of said brush seal, while enabling radial movement thereof.

* * * * *